May 21, 1968 T. E. MYERS Re. 26,394

SCR CONTROLLED CAPACITOR FED RELAY WITH FILTER MEANS

Original Filed July 13, 1964

INVENTOR.
Thomas E. Myers,
BY Parker & Carter
Attorneys.

United States Patent Office

Re. 26,394
Reissued May 21, 1968

26,394
SCR CONTROLLED CAPACITOR FED RELAY WITH FILTER MEANS

Thomas E. Myers, St. Charles, Ill., assignor to Ideal Industries, Inc., Sycamore, Ill., a corporation of Delaware Original No. 3,330,996, dated July 11, 1967, Ser. No. 382,128, July 13, 1964. Application for reissue Sept. 14, 1967, Ser. No. 669,987
6 Claims. (Cl. 317—147)

Matter enclosed in heavy brackets [ ] appears in the original patent but forms no part of this reissue specification; matter printed in italics indicates the additions made by reissue.

This invention relates to a control circuit utilizing a carrier signal to pass on operating current through a control coil.

A primary purpose of the invention is a control circuit of the type described utilizing a minimum of components and which is reliably operable over a given band of frequencies.

Another purpose is a control circuit of the type described which provides positive operation.

Another purpose is a control circuit using a gated rectifier which is held in a cut-off condition by a charged capacitor, with operating current for the control coil being provided by discharge of the capacitor.

Another purpose is a control circuit of the type described utilizing a band pass filter, with the filter providing an operating signal to the gate of a normally cut-off rectifier.

Another purpose is a control circuit of the type described which may be used in combination with similar control circuits, each circuit having a filter tuned to a different frequency band.

Other purposes will appear in the ensuing specification, drawings and claims.

The invention is illustrated diagrammatically in the following drawings wherein.

Figure 1:
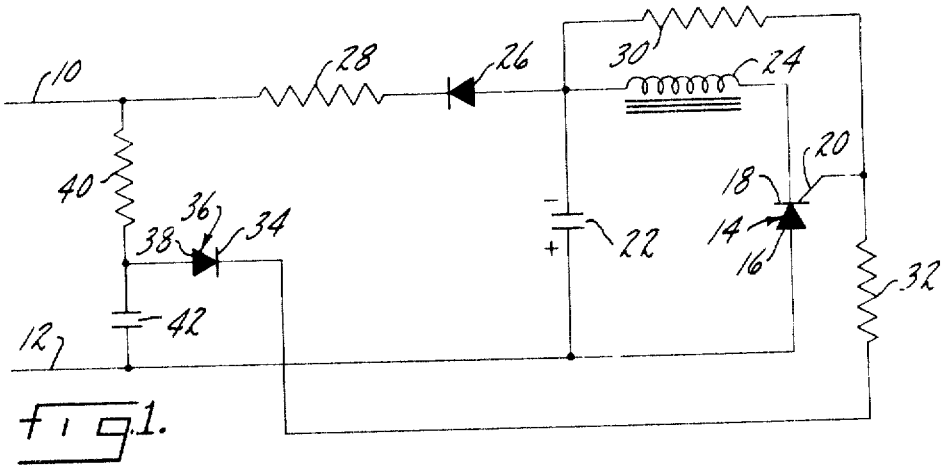
FIGURE 1 is a circuit diagram of one form of control circuit.

In FIGURE 1, the lines of a typical source of power may be indicated at 10 and 12. The invention has application as a line carrier control circuit, in which case the line may be a 117-volt, 60-cycle AC circuit. Other voltages and frequencies may also be satisfactory. A gated semi-conductor rectifier 14 may have an anode 16, a cathode 18 and a gate 20. The rectifier 14 may be a silicon controlled rectifier, or other satisfactory type of gated rectifier. The anode 16 is connected to one side of a capacitor 22 with the cathode 18 being connected to one side of a coil 24. The capacitor 22 and coil 24, along with the anode and cathode of the rectifier, form a series tank circuit. The coil 24 may be the coil of a relay, for example a latching relay, holding relay, or any other type of relay, or coil 24 may be the operating element of any type of control member. The capacitor 22 is connected through a diode 26 and a current limiting resistor 28 to line 10, while the other side of the capacitor 22 is connected directly to line 12. Diode 26 will permit capacitor 22 to charge up, in the polarity indicated, to a value determined by the probe voltage between lines 10 and 12.

SCR 14 is normally biased to an off condition by capacitor 22, the negative side of which is connected to gate 20 through resistor 30. In order to operate SCR 14 and permit the capacitor 22 to discharge through the coil and the SCR, a positive voltage must be applied to gate 20.

A bias "on" resistor 32 is connected to gate 20 and to cathode 34 of a diode 36. The anode 38 of diode 36 is connected between resistor 40 and a capacitor 42 which together are connected across or between lines 10 and 12. Resistor 40 and capacitor 42 form a filter, which is a somewhat side band type of filter.

In operation, and assuming that lines 10 and 12 represent a 60-cycle line at some particular voltage, capacitor 22 will charge up in the polarity indicated through diode 26 to a value in excess of the RMS voltage on the line, with the result that the negative charge on the capacitor will always be sufficient to overcome any voltage from the line that is applied across the SCR. If a carrier frequency, which is preferably not a multiple or harmonic of the line frequency, is applied on the line and the filter formed by resistor 40 and capacitor 42 is tuned to this particular frequency, diode 36 will apply the positive portion of the superimposed carrier signal through resistor 32 to the gate 20 to overcome the negative bias and permit the rectifier to conduct. Capacitor 22 will then discharge through the rectifier and coil, with the result that the coil receives operating current.

Of importance in the invention is the positive cut-off once a peak of current has passed through coil 24. Capacitor 22 and coil 24 form a tank circuit and as a result the discharge of the capacitor will cause damped-out oscillations in the tank circuit. The first positive peak of current will cause coil 24 to perform a control function, the negative half cycle which follows the operating positive peak will be effective to cut off the SCR. Because remaining oscillations will be rapidly damped out, there will be no further operation of coil 24.

Figure 2:
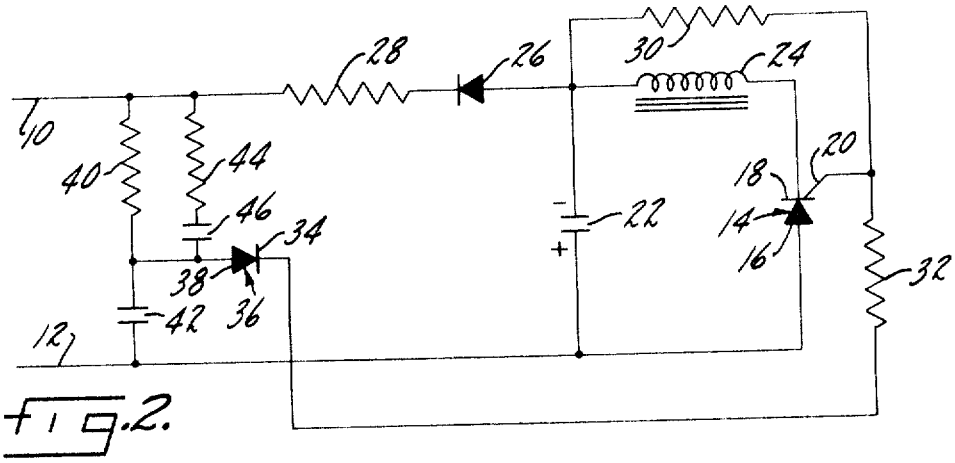
FIGURE 2 is a circuit diagram of a similar control circuit, but showing a different type of filter.

FIGURE 2 is identical with FIGURE 1 with the exception of the filter, and like numbers have been given to like parts. A resistor 44 and capacitor 46 form a series combination which is in parallel with resistor 40. The filter shown in FIGURE 2 is a narrower band filter than that of FIGURE 1, or what is commonly known in the trade as a medium band filter. By restricting the frequency range of the filter to a narrower band it is possible to provide a number of control circuits like that shown, each of which will operate at different frequencies. The operation of the circuit in FIGURE 2 is identical with that in FIGURE 1 and the only difference is the width of the band of frequencies passed by the filter.

Figure 3:
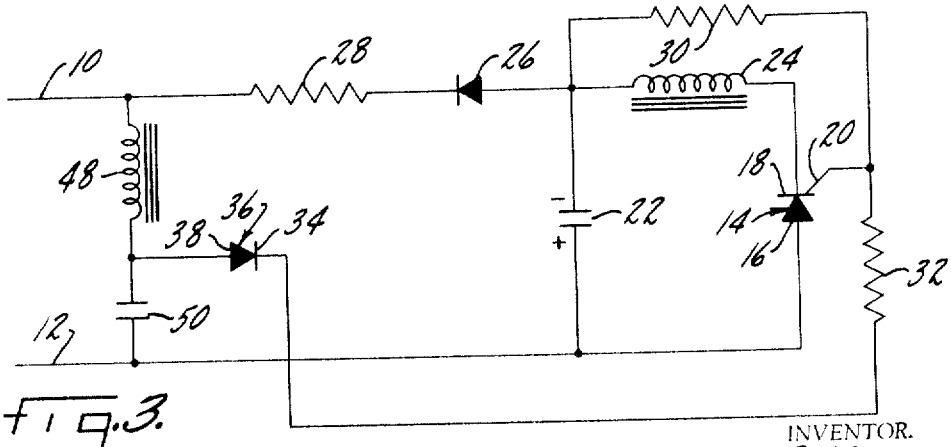
FIGURE 3 is a circuit diagram of a similar control circuit, but showing a third type of filter.

FIGURE 3 shows a circuit identical with FIGURE 1, with the exception of the filter, and again like parts have been given like numbers. A coil 48 is in series with a capacitor 50 with diode 36 being connected between coil 48 and capacitor 50. The filter formed by coil 48 and capacitor 50 is what is known in the trade as a narrow band pass filter. Again, the circuit of FIGURE 3 will operate in the same manner as the circuit of FIGURE 1, with the width of the frequency range of the filter being the only difference.

The use, operation and function of the invention are as follows:

The circuits shown are suitable for performing a control function on receipt of a signal within a predetermined frequency range. A group or series of such circuits may be connected to a power line with each circuit operating on receipt of a frequency different from that of the other circuits. The filters may be tuned to different frequencies. For example, assuming a 60-cycle power line, the circuits may be set to operate at frequencies of 500 cycles, 700 cycles, 900 cycles, 1100 cycles, etc. It is important that the frequencies which are used to operate each of the circuits not be multiples or harmonics of the basic line frequency.

The invention should not be limited to the use of a gated semiconductor rectifier. What is important is to provide an element which is normally in a cut-off condition because of a negative charge on the gate or grid or control element and which element can be operated by overcoming the negative bias.

The control element may be a relay, having contacts in the normal manner. It may be a latching relay or holding relay, with either mechanical, magnetic or electrical latching, or it may be any other type of control element, for example a coil in a memory circuit.

Of importance is the connection of capacitor 22. This element will be charged to peak line voltage, which voltage is in turn applied to the rectifier gate. The voltage on the gate will always be sufficient to overcome the RMS voltage applied between the anode and cathode of the rectifier.

Whereas the preferred form of the invention has been shown and described herein, it should be realized that there are many modifications, substitutions and alterations thereto within the scope of the following claims.

I claim:

1. In a control circuit, an AC source of power, a rectifier having an anode, cathode and gate, a control member having an operating coil, a capacitor in shunt relationship with the series-connected coil and rectifier, anode and cathode, one side of said capacitor being connected to one side of said source, and [said cathode] *a diode* connected between the other side of said capacitor and the other side of said source, said gate being connected to said capacitor to bias said rectifier to a cut-off condition, and a filter connected across said power source, a connection between said filter and said gate, the receipt of a signal from the power source within the frequency range of said filter overcoming the bias on the rectifier gate permitting the capacitor to discharge through the coil and rectifier.

2. The circuit of claim 1 further characterized in that said biasing means includes a resistor connected on one side to the gate and on the other side to the capacitor.

3. The circuit of claim 1 further characterized by and including a diode and a resistor connected between said filter and said gate, the anode of said diode being connected to said filter.

4. The circuit of claim 1 further characterized in that said filter includes a resistor and capacitor in series across said source, the connection to said gate being between said resistor and capacitor.

5. The circuit of claim 4 further characterized in that said filter includes a second resistor and capacitor, said second resistor and capacitor being series connected in parallel with said first-named resistor.

6. The circuit of claim 1 further characterized in that said filter includes a coil and capacitor in series across said source, the connection to said gate being between said coil and capacitor.

References Cited

The following references, cited by the Examiner, are of record in the patented file of this patent or the original patent.

UNITED STATES PATENTS

| | | | |
|---|---|---|---|
| 3,187,225 | 6/1965 | Mayer | 317—26 |
| 3,181,032 | 4/1965 | Myers | 317—33 |
| 3,160,795 | 12/1964 | Aune | 317—151 X |
| 2,907,929 | 10/1959 | Lawson | 317—151 X |

MILTON O. HIRSHFIELD, *Primary Examiner.*

J. A. SILVERMAN, *Assistant Examiner.*